June 1, 1926.

W. SEIZ 1,587,430

BRAKING SYSTEM

Filed July 29, 1924

Inventor:
Walter Seiz,
by
His Attorney.

Patented June 1, 1926.

1,587,430

UNITED STATES PATENT OFFICE.

WALTER SEIZ, OF BADEN, SWITZERLAND, ASSIGNOR TO GENERAL ELECTRIC COMPANY, A CORPORATION OF NEW YORK.

BRAKING SYSTEM.

Application filed July 29, 1924, Serial No. 728,972, and in Germany October 30, 1923.

My invention relates to systems for breaking the induction motor of a speed control aggregate wherein the motor is connected in cascade with a commutator machine, and has for its object the provision of an arrangement for utilizing the commutator machine to supply the excitation of the motor during its braking period.

It is well known that the speed of an induction motor may be controlled by variation in the excitation of a commutator machine which is supplied with current at slip frequency from the secondary circuit of the motor and which is operated at a speed proportional to that of the motor. Such a speed control system is disclosed by Letters Patent of John I. Hull, No. 1,306,594, June 10, 1919. It has been proposed to brake the induction motor in a system of this character by connecting one of the motor windings to a resistor and supplying the other of the motor windings with current from a separate exciting machine. This method of braking has the disadvantage that it requires the provision of a separate source of current for exciting the motor during braking. In accordance with my invention, this difficulty is avoided by utilizing the commutator machine for supplying the braking current required by the motor.

My invention will be better understood on reference to the following description when considered in connection with the accompanying drawing and its scope will be pointed out in the appended claims.

Figure 1:
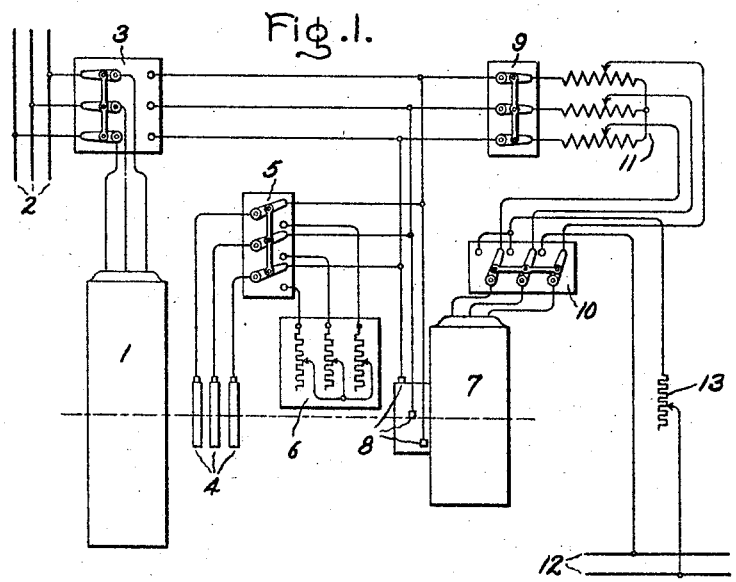
Figure 2:
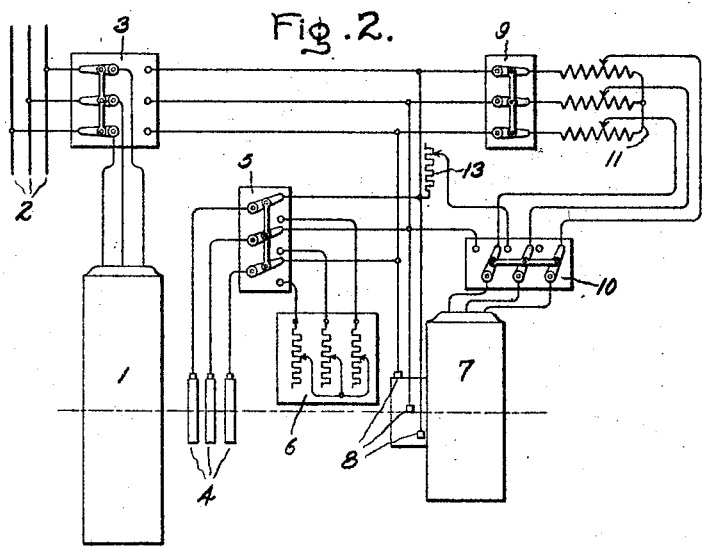

Referring to the drawing, Fig. 1 shows a speed control system in which my invention has been embodied; and Fig. 2 shows a system which differs from that shown by Fig. 1 in that the commutator machine is arranged to supply its own excitation during the braking period.

Fig. 1 shows an induction motor 1 which is arranged to have its primary winding supplied with polyphase currents through the line 2 and the double throw switch 3 and which is provided with a secondary winding having its terminals connected to the slip rings 4. A switch 5 is provided for connecting the slip rings 4 either to an adjustable starting resistor 6 or to a commutator machine 7. The secondary winding of the motor 1 is arranged to be interconnected with the rotor winding of the commutator machine 7 through slip rings 4, switch 5 and commutator brushes 8, and with the stator winding of the commutator machine 7 through slip rings 4, switches 5, 9 and 10, and an adjustable transformer 11. In its left hand position, the switch 10 is arranged to connect the stator winding of the machine 7 to a direct current line 12 through an adjustable resistor 13.

Assuming the switch 3 to be closed as illustrated and current to be supplied to the motor 1 from the line 2, the motor may be put into operation by closing the switch 5 in its lower position and adjusting the resistor 6. When the motor is in operation, the switch 5 is operated to its upper closed position and, with the switches 3, 9 and 10 in their illustrated positions the excitation of the machine 7 is determined by the adjustment of the transformer 11 which may be regulated to control the speed of the motor 1. When it is desired to brake the motor 1, the switch 9 is opened and the switches 3, 5 and 10 are moved to their illustrated closed positions. Under these conditions, the secondary winding of the motor 1 is connected to the resistor 6 and the primary winding of the motor 1 is arranged to be supplied with direct current from the brushes of the machine 7 which is excited by direct current from the line 12 and now operates as a direct current generator. During the braking period, the torque of the motor 1 may be varied as required by adjusting the resistors 6 and 13.

Fig. 2 shows a speed control system which differs from that of Fig. 1 in that the machine 7 is arranged to supply both its own excitation and that required by the motor 1 during braking. In this modification, braking is initiated as set forth in connection with Fig. 1 except that in its left hand position the switch 10 connects both one phase of the stator winding of the machine 7 and the primary winding of the motor 1 to the commutator brushes of the machine 7 which operates as a self excited generator to supply the excitation required by the two machines. The operation of the system shown by Fig. 2 will be readily understood without detailed explanation.

I have explained my invention by illustrating and describing certain specific embodiments thereof, but it will be readily understood by those skilled in the art that the arrangements of these embodiments may be modified in certain of their details. I, accordingly do not wish to be restricted to the particular arrangements disclosed herein by way of example for the purpose of setting forth my invention in accordance with the patent statutes. The terms of the appended claims are, therefore, not restricted to the precise arrangements disclosed, but are intended to cover all changes within the true spirit and scope of my invention.

What I claim as new and desire to secure by Letters Patent of the United States is:—

1. A speed control system for induction motors comprising in combination with such a motor, a commutator machine, connections for connecting said machines in cascade relation for controlling the speed of said motor during normal operation, means for supplying said commutator machine with direct current and connections for supplying direct current from said commutator machine to said motor for braking purposes.

2. A speed control system comprising an induction motor and a commutator machine, connections for connecting said machines in cascade, means for varying the flow of current in said cascade connection for controlling the speed of said motor, a source of direct current for exciting said commutator machine and connections for supplying braking current to said motor from said commutator machine.

3. The method of controlling the speed of an induction machine by means of a commutator machine which consists in connecting said machines in cascade for normal induction motor operation, and altering the connections, and operating said commutator machine as a direct current generator so as to supply direct current excitation to said induction machine for braking purposes.

In witness whereof, I have hereunto set my hand this 11 day of July, 1924.

WALTER SEIZ.